United States Patent [19]
Pacholok et al.

[11] Patent Number: 5,921,704
[45] Date of Patent: Jul. 13, 1999

[54] MECHANICAL TIRE DEFLATING DEVICE

[76] Inventors: David R. Pacholok, 1815 W. Higgins Rd., Sleepy Hollow, Ill. 60118; Charles A. Kuecker, 326 Devron Cir., Cary, Ill. 60013

[21] Appl. No.: 09/122,944

[22] Filed: Jul. 27, 1998

Related U.S. Application Data

[62] Division of application No. 08/804,399, Feb. 21, 1997, Pat. No. 5,839,849.

[51] Int. Cl.⁶ .............................. E01F 13/00; E01F 15/00; E04H 17/00
[52] U.S. Cl. ........................................................ 404/6; 256/1
[58] Field of Search .......................... 404/6; 256/1, 13.1; 180/287

[56] References Cited

U.S. PATENT DOCUMENTS

| | | | |
|---|---|---|---|
| 3,387,824 | 6/1968 | Jonas et al. | 256/1 |
| 3,517,912 | 6/1970 | Foley | 256/1 |
| 4,382,714 | 5/1983 | Hutchison | 404/6 |
| 4,544,303 | 10/1985 | Glasmire | 404/6 |
| 5,611,408 | 3/1997 | Abukhader | 180/287 |
| 5,704,445 | 1/1998 | Jones | 180/287 |
| 5,820,293 | 10/1998 | Groen et al. | 404/6 |

*Primary Examiner*—Thomas B. Will
*Assistant Examiner*—Gary S. Hartmann
*Attorney, Agent, or Firm*—Mathew R. P. Perrone, Jr.

[57] ABSTRACT

A mechanical tire deflating device provides a mechanism to deploy a folded deflating spike under a vehicle desired to be stopped. When the mechanical tire deflating device is under the vehicle being pursued, tire deflating spikes are extended in order to deflate the tires of the pursued vehicle.

3 Claims, 5 Drawing Sheets

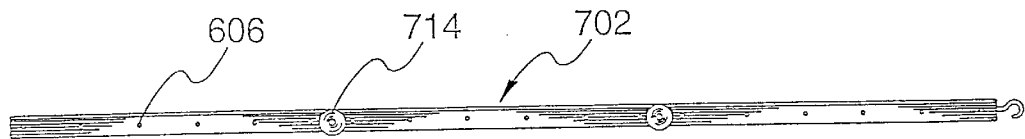
Fig.12.
Fig.11.
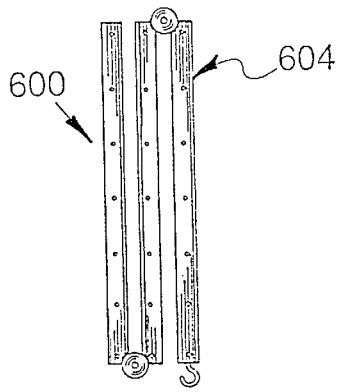
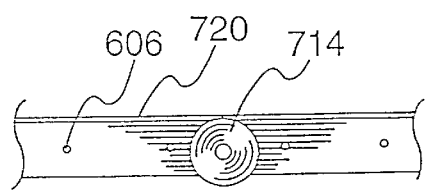
Fig.13.
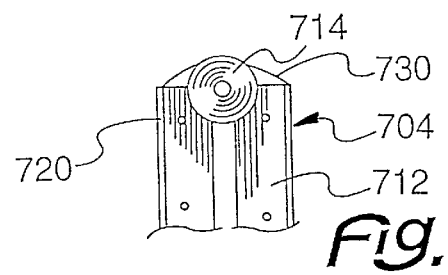
Fig.14.
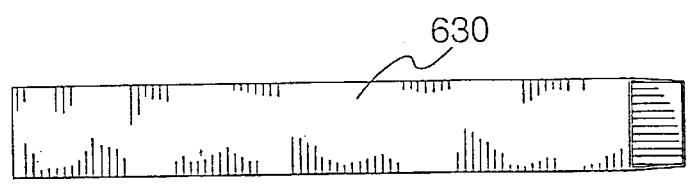
Fig.15.

MECHANICAL TIRE DEFLATING DEVICE

CROSS REFERENCE TO RELATED APPLICATION

This application is a divisional application of U.S. patent application Ser. No. 08/804,399 as originally filed on Feb. 21, 1997, U.S. Pat. No. 5,839,849.

This invention relates to a vehicle disabling device and more particularly to a device and method for disabling a vehicle with a launching mechanism containing stinger spikes.

BACKGROUND OF THE INVENTION

In this litigious society, even a police chase after a criminal can prove dangerous to the municipality, which sponsors the police department. Such a high speed police chase sometimes causes injury to the pursuing police officer, or an innocent bystander, in addition to the offending motorist or other criminal.

Not only does an innocent party suffer improperly, he or she can also suffer substantial injuries for merely being at the wrong place at the wrong time. This problem has become so severe that a number of states are even restricting high speed police chases by statute.

From both a military and civilian standpoint, it can be desirable to disable a vehicle, in a simple fashion without creating a danger to the surrounding area. Various known electronic devices are most ineffective. These devices can flatten tires or disable engines.

Known devices exist which can flatten or incapacitate a vehicle tire. If this occurs at a high speed, the driver may lose control of the vehicle. An uncontrolled vehicle is extremely dangerous. Whether the tire flattening device is electronically or mechanically actuated, it is highly desirable to disable the vehicle and incapacitate the escape mechanism without this danger of losing control of the vehicle.

Local, state, and federal police agencies are especially concerned with reducing or eliminating high speed pursuits or target vehicles because of the potentially disastrous effects on public and/or private property and the personal welfare of non-involved third parties. In addition to the almost unacceptable chance of hurting an innocent party, the financial costs thereof can be immense.

It is always desired to minimize the dangers inherent in a police pursuit. If the dangers can be minimized, the dangers to innocent bystanders as well as to the police car and pursued vehicle can also be minimized. Furthermore, it is extremely useful if this can be done with an inexpensive device without causing severely damage to the vehicle.

There are devices known which short circuit the electronics of a modern computer controlled vehicle. However, these devices cannot work on the older model vehicle, which is not computer controlled. This device also makes it difficult to repair the vehicle being pursued. It is desired to more simply halt the vehicle without creating great danger or property damage.

Tire deflating devices are known to do this. However, these devices suffer from positioning and other problems. It is difficult to position devices to deflate the tires without endangering other cars. Also, an abrupt blowout can create a hazard to the vehicle being pursued. Thus, if the tire deflation is desired, it is useful to deflate them in a relatively safe manner. Accordingly, efforts must be made in this behalf.

An additional problem is that a deflating device is difficult to handle safely. Safe handling requires some way of storing the spikes in a deflating device until it is desired to deflate a tire. From that stored position, it is desired to deploy the spikes as efficiently as possible. These factors are so contradictory, that to maximize one requirement of safety reduces the efficiency when deployed.

SUMMARY OF THE INVENTION

Therefore, among the many objectives of this invention is to provide a device for deflating a tire of vehicle with a carefully placed and storable but activatable strip of tire deflating spikes.

A further objective of this invention is to provide a vehicle disabling device fixed in the road.

A still further objective of this invention is to provide a mobile vehicle disabling device.

Yet a further objective of this invention is to provide a vehicle disabling device, which dissipates the kinetic energy of a vehicle.

Also an objective of this invention is to provide a device to minimize the danger of police chase.

Another objective of this invention is to provide a device to deflate a vehicle tire with minimized danger to a bystander.

Yet another objective of this invention is to provide a device to safely deflate a vehicle tire of a criminal.

Still another objective of this invention is to provide a device to safely handle a tire deflating device.

A further objective of this invention is to provide an easily deployed vehicle disabling device.

These and other objectives of the invention (which other objectives become clear by consideration of the specification, claims and drawings as a whole) are met by providing a deployable tire deflating device, with tire deflating spikes, which remain in a stored position until activated.

BRIEF DESCRIPTION OF DRAWINGS

FIG. 11 depicts a top plan view of linear, pivoted tire deflating device 600 in stored position 604.

FIG. 12 depicts a top plan view of pivoted spring tire deflating device 600 in deployed position 602.

FIG. 13 depicts a top plan view of cable tire deflating device 700 in deployed position 702.

FIG. 14 depicts a partial, top plan view of cable tire deflating device 700 in stored position 704.

FIG. 15 depicts a full side view of cable tire deflating device 700 in stored position 704, based on rotating FIG. 14 ninety degrees about its longitudinal axis.

Throughout the figures of the drawings, where the same part appears in more than one figure of the drawings, the same number is applied thereto.

DESCRIPTION OF THE PREFERRED EMBODIMENTS

Figure 1:
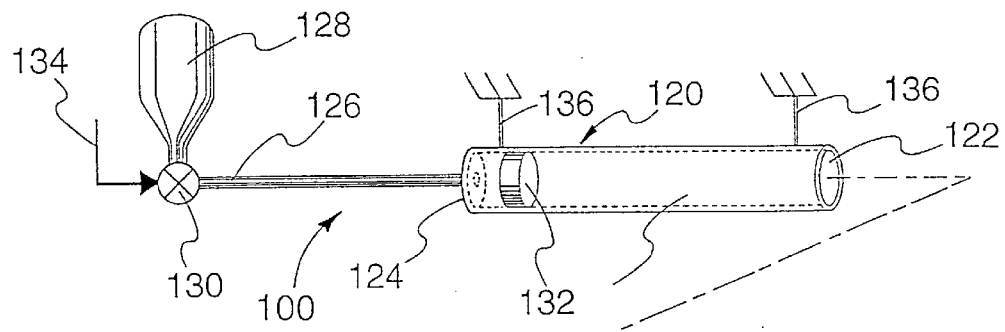
FIG. 1 depicts a top, plan, exploded/view of a mounted, spring-loaded, tire deflating device 100 in stored position 102.
Figure 1:
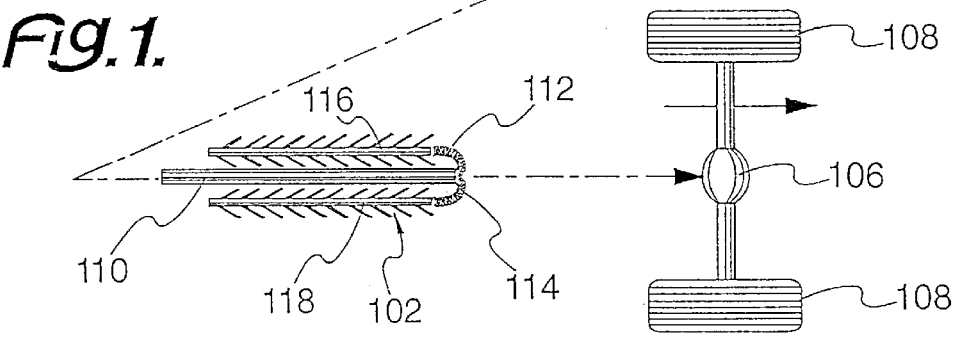

A deployable tire deflating device, with tire deflating spikes, has the tire deflating spikes in a stored position. Upon activation, at least one tire desired to be flattened can be deflated. The deployable tire deflating device may then be safely handled while in a stored position, but deployed efficiently, when required.

The concept is that a launching mechanism utilizing compressed gas, such as carbon dioxide, or a pyrotechnic charge can propel a folded projectile consisting of extensible arms containing commercially available. Into these may be place tire deflating spikes. Such tire deflating spikes are well-known in the art as evidenced by U.S. Pat. No. 5,452, 962 to Kenneth J. Greves; and U.S. Pat. No. 5,330,285 to Greves et al.; both patents being incorporated herein by reference.

When the projectile reaches the end of a suitable tether lead, an internal extension mechanism will be triggered to extend the spiked arms out from the projectile. The pursued vehicle will then run over the spiked arms, deflating the target vehicle's tires.

The extension mechanism can be spring driven, gas driven, propellant driven, or explosive driven. Various mechanisms for the actual extensions, such as leaf springs, inflatable tubes, or cables and pivots may be used.

In use, a pursuing vehicle will approach and line up on the target. The system is triggered by first arming the launcher, then hitting the pursuit vehicle's brakes, which can actually launch the projectile through a connection to the braking system of the pursuing vehicle. This strategy can prevent the pursuing car from running over the launched spike strips.

This mechanical tire deflating device mounts under the carriage of a squad car. The device is then launched from the squad car under the vehicle being pursued. As the device goes under the vehicle, a pin is triggered or pulled, and the spikes are deployed. The coil is deployed by a standard triggering mechanism. The two spike bars are spring loaded when the triggering mechanism is released, each spike bar will go under a tire.

In a preferred form, there is a pin retaining mechanism for the spring. As the device is launched, the pin is pulled and the spike bars are deployed. The two spike bars are spring loaded to a center bar. At the other end of the spring, the spike bars are pinned together. As the device is fired, the pinning of the bars is released and the device is permitted.

As another alternative, the spikes can be sharpened and also have the shape of a hollow tube. These devices can be pinned in place and released upon launch. As these devices are released, the desired projectile and stopping of the tire is permitted.

The devices are armed by folding the spike strips down and inserting a pin. As the pin is pulled, the latch is released. The pin is pulled after launch and at the desired time. With the launch and the desired pin pulling, the spikes are disbursed. As the spikes are disbursed, the tire of the pursued vehicle may roll over the spikes and be deflated.

Alternatively, the three spike strips can be folded in an accordion fashion and deployed by release of the pin. The pivots permit for a longer tube and provide for a launch tube short length with spike strips therein employed.

It is also possible to position a strip of retained spikes in a street. These spikes may be activated from a pursuing police car at the time the vehicle passes over the spikes and retract it so that the pursuing police vehicle does not get interrupted.

Figure 2:
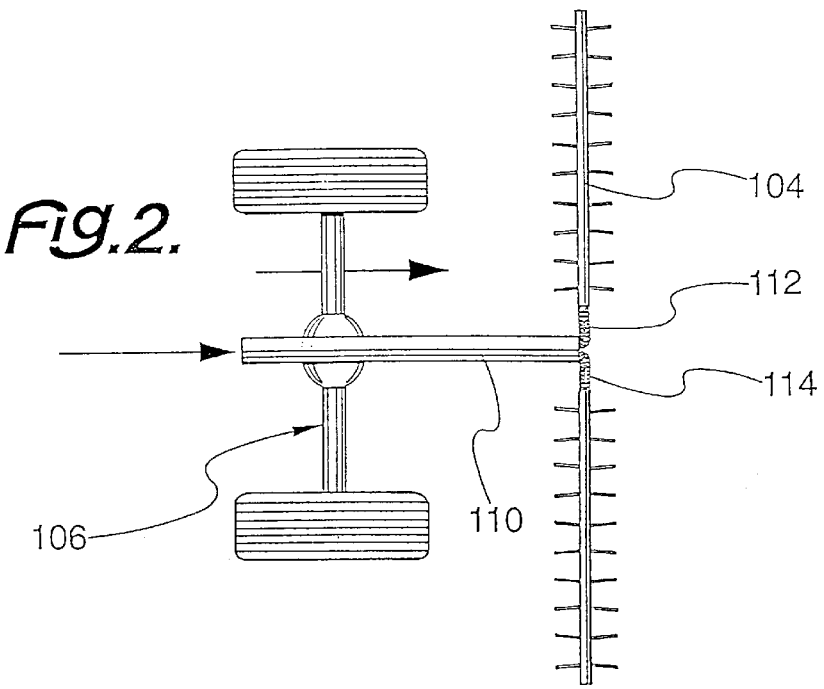
FIG. 2 depicts a bottom plan view of pivoted tire deflating device 100 in deployed position 104.

Referring now to FIG. 1 and FIG. 2, the spring loaded tire deflating device 100 is depicted. In FIG. 1, the spring loaded tire deflating device 100 is shown in stored position. In FIG. 2, the spring loaded tire deflating device is shown in deployed position 104. The spring loaded tire deflating device includes a central mounting bar 110.

The central mounting bar 110 has a first spring 112 and a second spring 114 secured to one end thereof. Secured to first spring 112 is first spike strip 116. Secured to second spring 114 is second spike strip 118. The central mounting bar 110 with the first spike strip 116 and the second spike strip 118 collapsed on opposite sides thereof, are secured inside launch tube 120.

Launch tube 120 has an open end 122 and an oppositely-disposed closed end 124. The closed end 124 is connected by a pipe 126 to a gas container 128. The gas container 128 is connected to the pipe 126 by release valve 130. When it is desired to launch spring loaded tire deflating device 100 from the launch tube 120, the valve 130 is opened releasing a gas, such as carbon dioxide. The gas forces a piston 132 against the spring loaded tire deflating device 100, thereby ejecting the same from launch tube 120 through open end 122. A trigger 134 may be mounted appropriately to activate the gas container 128.

Figure 5:
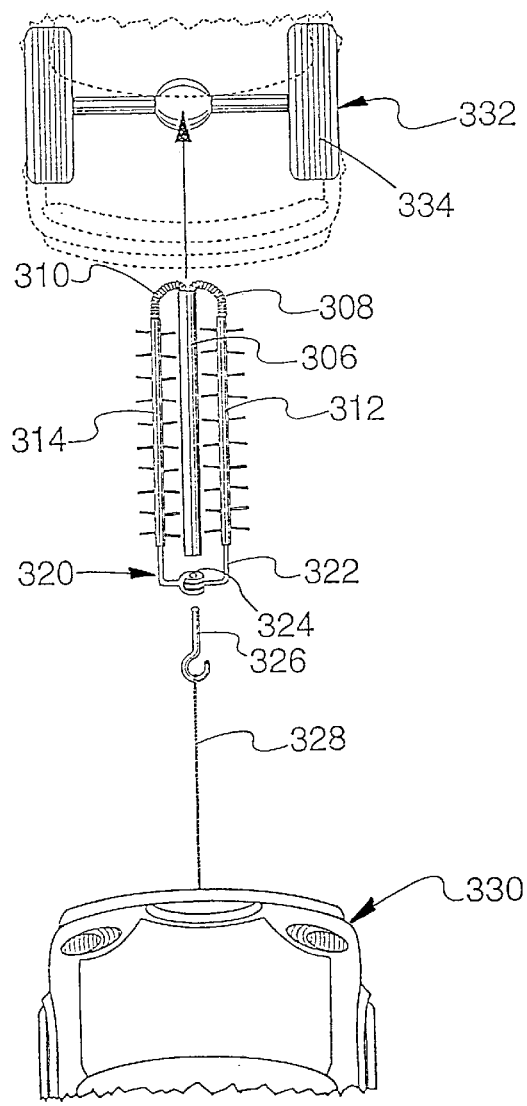
FIG. 5 depicts a top plan view of pinned spring tire deflating device 300 in stored position 304.

Launch tube 120 and spring loaded tire deflating device 100 may secured to a pursuit vehicle such as the pursuit vehicle 330 shown in FIG. 5 in any suitable fashion. In particular, mounting device 136 or pairs thereof may be used as appropriate mounting devices and secured to any part of the pursuit vehicle.

As the spring loaded tire deflating device 100 deploys, it passes under the axle 106 of a vehicle to be stopped. After it passes under the axle 106, the coil springs 112 and 114 cause the spike strips 116 and 118 to deploy perpendicular to the mounting bar 110. Then the spike strips 116 and 118 contact the tires 108 and deflate the same.

Figure 3:
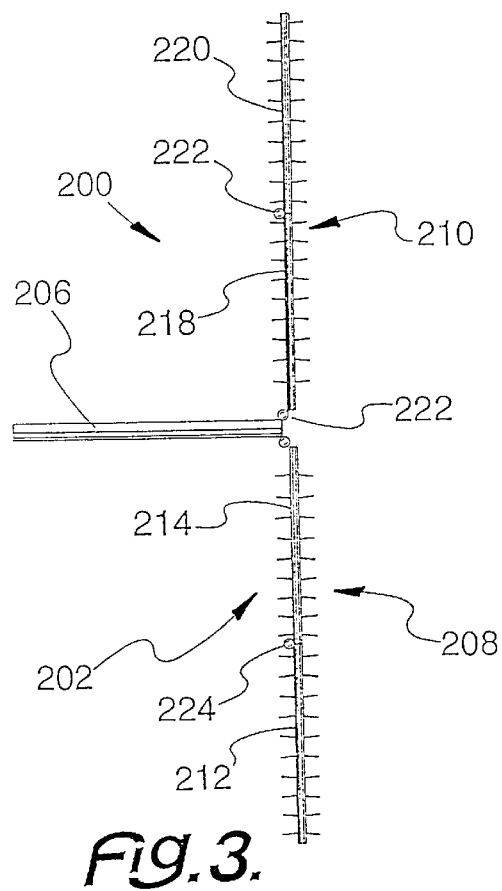
FIG. 3 depicts a top plan view of double-arm pivoted tire deflating device 200 in deployed position 202.
Figure 4:
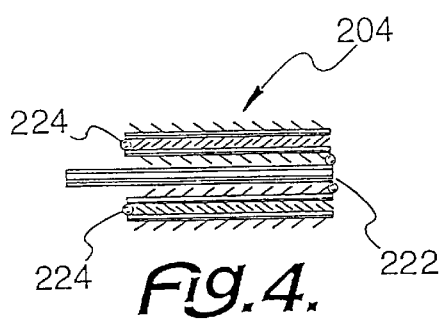
FIG. 4 depicts a top plan view of double-arm pivoted tire deflating device 200 in stored position 204.

In FIG. 3 and FIG. 4, the double arm pivoted tire deflating device 200 is depicted. FIG. 3 shows the deployed position 202 for the double armed pivoted tire deflating device 200, while FIG. 4 shows a stored position 204 for the double armed spring tire deflating device 200. Double armed pivoted tire deflating device 200 includes an extension mechanism 206.

Mounted to extension mechanism 206 are a first double arm spike strip 208 and a second double arm spike strip 210. Preferably first double arm spike strip 208 and second double arm spike strip 210 are similar in structure. First double arm spike strip 206 includes a first end piece 212 and a first interior piece 214. Second double arm spike strip 210 includes a second interior piece 218 and a second outer piece 220.

Between the extension mechanism 206, and each of first interior piece 214 and second interior piece 218 is an extension pivot joint 222. Joining of first end piece 212 and first interior piece 214 strip at pivot joint 222 is accomplished by a pivot device 224. A second pivot device 224 joins second interior piece 218 and a second outer piece 220. Pivot joint 222 combines with pivot device 224, to permit straightening and folding of both first double arm spike strip 208 and second double arm spike strip 210.

Both pivot devices 224 combine to permit both a first double arm spike strip 208 and a second double arm spike strip 210 to be stored parallel to the extension mechanism 206. After the double armed pivoted tire deflating device 200 is deployed, each of spike strips 208 and 210 are perpendicular to the extension mechanism 206.

In FIG. 5, a pin spring tire deflating device 300 is depicted. Pinned spring tire deflating device 300 includes a pinned mounting bar 306. Attached to one end of the pinned mounting bar 306 is a first pin spring 308 and a second pin spring 310. To each of pin springs 308 and 310 is attached a first spike bar 312 and a second spike bar 314, respectively.

Oppositely disposed from each of the pin springs 308 and 310, is a pin mechanism 320, which locks first spike bar 312 and second spike bar 314 in a position parallel to the center mounting bar 306. Each of spike bar 312 and 314 includes an arcuate bar 322 with a pin aperture 324 therein.

The pin apertures 324 will become co-axial and may receive a pin 326 through both of them.

The pin 326 is connected by a spring attachment, such string or cable 328, to a pursuit vehicle 330. The pursuit vehicle 330 launches the pinned spring tire deflating device 300 on the spring attachment 328. As the spring tire deflating device 300 approaches the pursued vehicle 332, the pin 326 releases, thereby deploying the spike bars 312 and 314 perpendicular to the pinned mounting bar 306, thereby permitting the tire 334 of the pursued vehicle 332 to be deflated.

Figure 6:
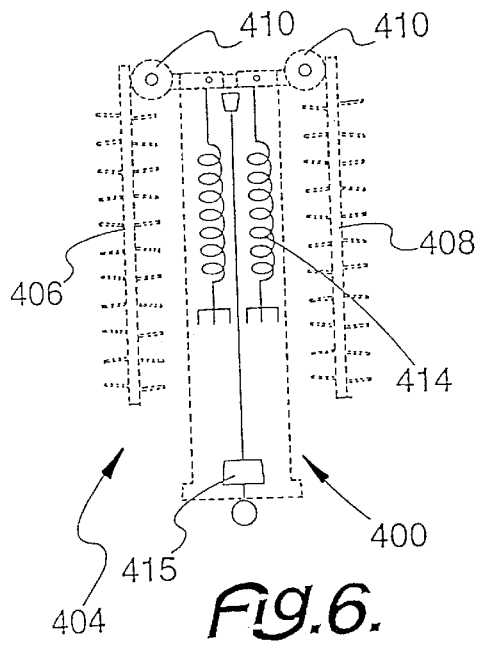
FIG. 6 depicts a top plan view of pivoted spring tire deflating device 400 in stored position 404.
Figure 7:
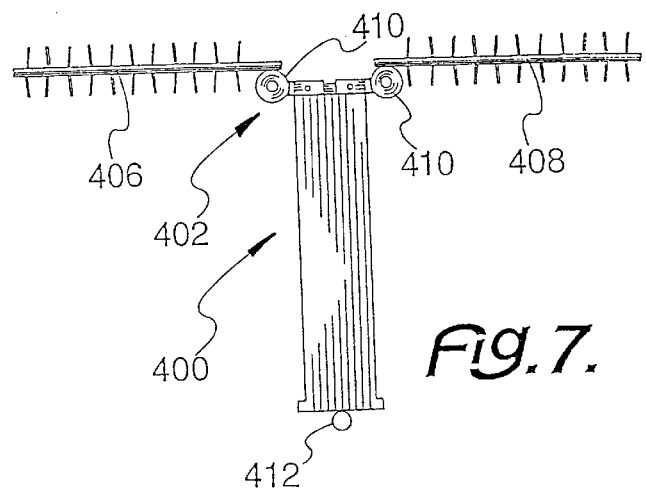
FIG. 7 depicts a top plan view of pivoted spring tire deflating device 400 in deployed position 402.

FIG. 6 and FIG. 7 combine to depict forward pivoted tire spring deflating device 400. FIG. 6 shows the stored position 404 thereof, while FIG. 7 shows the deployed position 402. The pivoted tire spring device 400 has again a first pivoted spike arm 406 and a second pivoted spike arm 408 secured to a center spring loaded rod 412 by pivots 410.

The spring loaded rod 412 includes extension springs 414, which hold first pivoted spike arm 406 and a second pivoted spike arm 408 in stored position 404 until activation to deployed position 402. As in an earlier described fashion, the first pivoted spike arm 406 and a second pivoted spike arm 408 are perpendicular to the center spring loaded rod 412 upon deployment. The springs 414 and the pivots 410 combine for an efficient deployment, due to release of the latch with ball detente 415.

Figure 8:
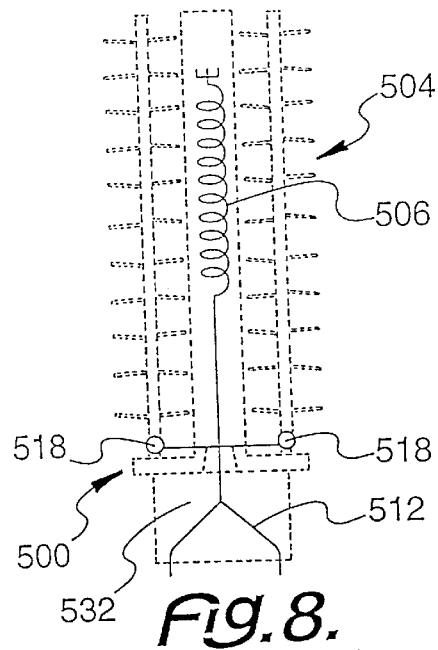
FIG. 8 depicts a top plan view of pipe spring tire deflating device 500 in stored position 504.
Figure 9:
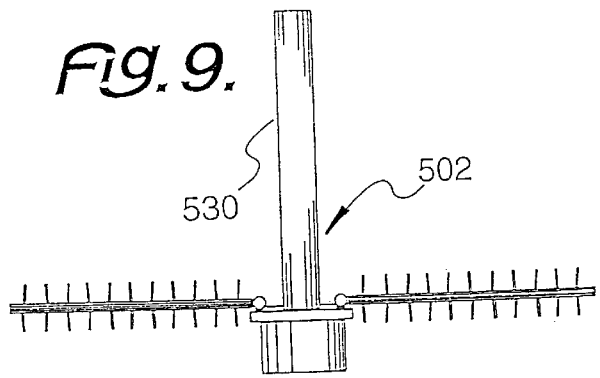
FIG. 9 depicts a top plan view of pipe spring tire deflating device 500 in deployed position 502.
Figure 10:
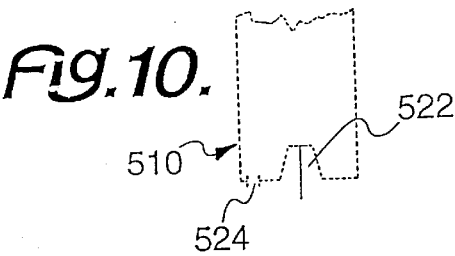
FIG. 10 depicts a top plan view of wire launch tube 510 for pipe spring tire deflating device 500 in deployed position 502.

In FIG. 8 and FIG. 9, the pipe spring tire deflating device 500 is stored within a pipe 510. The pipe spring tire deflating device 500 has a stored position 504, with an extension spring 506 in a launch tube 510. The launch tube 510 has a wire 512, which triggers the deployment of the spike wands 514 and 516 through a spike pivot 518. The spike wands 514 and 516, along with wire 512 are activated.

When deployed, the pipe spring tire deflating device 500 is similar to the pivoted spring tire deflating device 400 of FIG. 7. However, the center wand 530 is reversed relative to the tires 108 to be deflated.

In other words, the center wand 530 of FIG. 8 may well be between the tires while the spike wands 514 and 516 are deployed deflating the tires while the center portion of FIG. 7 is reversed. The launch tube 510 includes a release wire spool 522 with a propellant inlet 524 in the launch tube 510. In this fashion, the detente 530 can hold the wands 514 and 516 in place until the desired release position for wands 514 and 516 is obtained.

In FIG. 11 and FIG. 12, the pivoted spring tire deflating device 600 is shown. There are three of a spike strip 606 connected linearly by a pivot assembly 608. Pivot assembly 608 permits a parallel stored position 612, so that each spike strip 606 is adjacent to at least one other.

These pivoted spike strips 606 are held in place by a pin 610. As the pivoted spring tire deflating device 600 is deployed, the pin 610 is pulled, and the three spike strips 606 go in a linear deployed position 620. These spike strips 606 can be retained in a rectangular tube 630, which is flatter than normal and short, when compared to the total length of the three spike strips 606 in deployed position 620.

FIG. 13, FIG. 14 and FIG. 15 depict a cable tire deflating device 700. Two spike arms 710 and 712 are pivoted around a cable pivot 714. Upon release from a cable tube 720, the cable 730 actuates and renders the spike arms 710 and 712 linear, thereby deploying the same.

Figure 16:
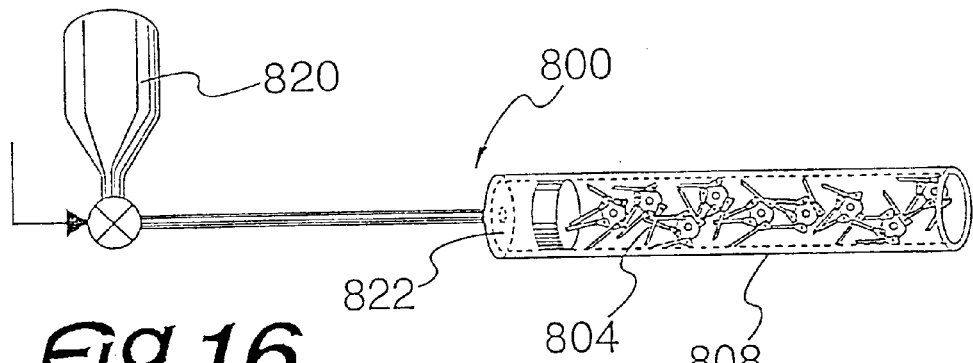
FIG. 16 depicts a top plan view of a spiked ball tire deflating device 800 in stored position 804.
Figure 17:
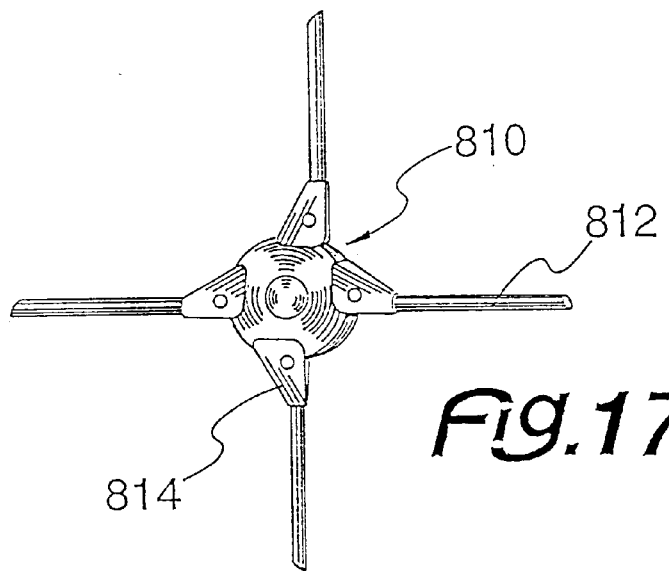
FIG. 17 depicts a spiked ball 810 from spiked ball tire deflating device 800.

In FIG. 16 and FIG. 17, the spike ball tire deflating device 800 is depicted. Spike ball tire deflating device 800 includes a ball launch tube 808 having a series of spiked balls 810 therein. The spiked balls 810 have a plurality of sharpened, hollow tube spikes 812 therein and thereon mounted on a sphere. Each hollow tube spike 812 is spring hinged assembled to the spikes ball 810 by a standard spring hinge device 814.

These spiked balls 810 are contained within the launch tube 808 prior to deployment. A ball explosive charge 820 at a closed end 822 of launch tube 808. Upon detonation, the spike balls 810 scatter like shotgun blast of beebees and deploy into the tires 108 thereby deflating the same.

Figure 18:
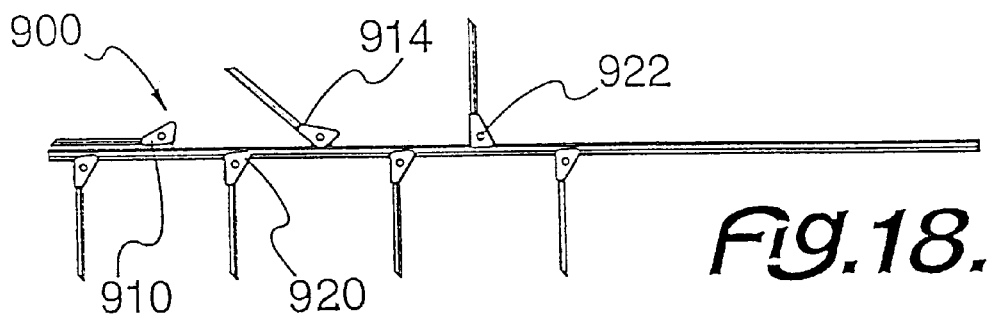
FIG. 18 depicts a side, progressive view of latched spike device 900.

In FIG. 18, a spring latch device 900 is depicted in a strip form 902. The spring latch device 900 is shown as having a stored, that is an undeployed spike 910, a deploying spike 914, and a deployed and locked spike 920, ready for use. Deployed and locked spike 920 is supported by the strip spring hinge assembly 922 similar to that of similar to spring hinge assembly of FIG. 16. Upon activation of course all spikes in strip form 902 are deployed and locked spike 920.

The spring latch device 900 may be laid in strips out along appropriate routes, and deployed or retracted on command from the pursuing police vehicle. The command may be given electronically or mechanically by a standard device. In this fashion, the desired results of stopping the appropriate vehicle can be accomplished.

Any launch of the devices depicted in FIG. 1 through FIG. 16 can be accomplished with the rocket launch device depicted is U.S. Pat. No. 5,503,059 to David R. Pacholok, who is also a co-inventor of this application. Any activation of the device depicted in FIG. 17 can be accomplished with the in place device depicted in the said U.S. Pat. No. 5,503,059 to David R. Pacholok.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. A spiked ball tire deflating device having a stored position and a deployed position, the tire deflating device, comprising:

(a) a launch tube being filled with at least one ball;

(b) the at least one ball having a plurality of spikes thereon;

(c) a launching means for releasing the at least one ball from the launch tube;

(d) the plurality of spikes having a storing mechanism, (e) the storing mechanism serving to collapse the plurality of spikes while the at least one ball is in the launch tube; and (f) the storing mechanism serving to extend the plurality of spikes as the at least one ball is released from the launch tube.

2. The spiked ball tire deflating device of claim 1 further comprising:

(a) the at least one ball including a sphere;

(b) the sphere having plurality of sharpened, hollow tube spikes mounted thereon; and (c) a spring device connecting the plurality of sharpened, hollow tube spikes to the sphere for assisting in storing or releasing the plurality of sharpened, hollow tube spikes.

3. The spiked ball tire deflating of claim 2 further comprising:

(a) the launch tube having a closed end and an open end; and (b) an explosive charge being mounted at the closed end and being adapted to launch the at least one ball through the open end.

* * * * *